United States Patent
Barr et al.

[19]

[11] Patent Number: 6,112,792
[45] Date of Patent: Sep. 5, 2000

[54] FIBER PLACEMENT MID-SPAN REDIRECT

[75] Inventors: Roy L. Barr; Daniel D. Bloch, both of St. Peters; Andrew R. Mallow, Florissant; Charles A. Rhodes, St. Louis, all of Mo.

[73] Assignee: The Boeing Company, Seattle, Wash.

[21] Appl. No.: 09/197,088

[22] Filed: Nov. 19, 1998

[51] Int. Cl.[7] .............................. B65H 57/00; B65H 65/00
[52] U.S. Cl. ......................... 156/441; 156/574; 242/437; 242/615.2
[58] Field of Search ..................................... 156/433, 441, 156/574; 242/437, 437.3, 447, 447.1, 447.3, 615.2

[56] References Cited

U.S. PATENT DOCUMENTS

| | | |
|---|---|---|
| 4,382,836 | 5/1983 | Frank . |
| 4,560,433 | 12/1985 | Frank . |
| 4,790,898 | 12/1988 | Woods . |
| 4,869,774 | 9/1989 | Wisbey . |
| 4,872,619 | 10/1989 | Vaniglia . |
| 4,877,193 | 10/1989 | Vaniglia . |
| 4,907,754 | 3/1990 | Vaniglia . |
| 4,946,538 | 8/1990 | Bendarzewski et al. . |
| 5,022,952 | 6/1991 | Vaniglia .................................. 156/441 |
| 5,045,147 | 9/1991 | Benson et al. . |
| 5,110,395 | 5/1992 | Vaniglia . |
| 5,223,072 | 6/1993 | Brockman et al. . |
| 5,239,457 | 8/1993 | Steidle et al. . |
| 5,273,614 | 12/1993 | Grimshaw et al. . |
| 5,290,389 | 3/1994 | Shupe et al. . |
| 5,447,586 | 9/1995 | Tam . |
| 5,454,897 | 10/1995 | Vaniglia . |
| 5,698,066 | 12/1997 | Johnson et al. . |

*Primary Examiner*—Michael W. Ball
*Assistant Examiner*—Michael A Tolin
*Attorney, Agent, or Firm*—Christensen O'Connor Johnson & Kindness PLLC

[57] ABSTRACT

A composite fiber placement mid-span redirect device (10) mounted on a fiber placement assembly (12) guides a plurality of composite material tows (14) along a fiber path from a material supply creel (20) to a fiber placement head (30) during a composite forming process. The mid-span redirect device (10) includes a frame assembly (38) to which a plurality of outer swivel roller assemblies (80) and a plurality of inner swivel roller assemblies (90) are attached. Each outer swivel roller assembly (80) contains an outer roller (82), an outer capture roller (84), an outer swivel bracket assembly (86), and a counterbalancing member (88). Each inner swivel assembly (90) contains an inner roller (92), an inner swivel bracket assembly (96), and a counterbalancing member (98). The outer swivel assemblies (80) and inner swivel assemblies (90) work in concert with one another to accommodate six axes of motion from a fiber placement assembly (12), and simultaneously allow the fiber tows (14) to move bi-directionally, both towards the material supply creel (20) and alternately towards the fiber placement head (30), without inducing twisting of the fiber tows (14).

48 Claims, 6 Drawing Sheets

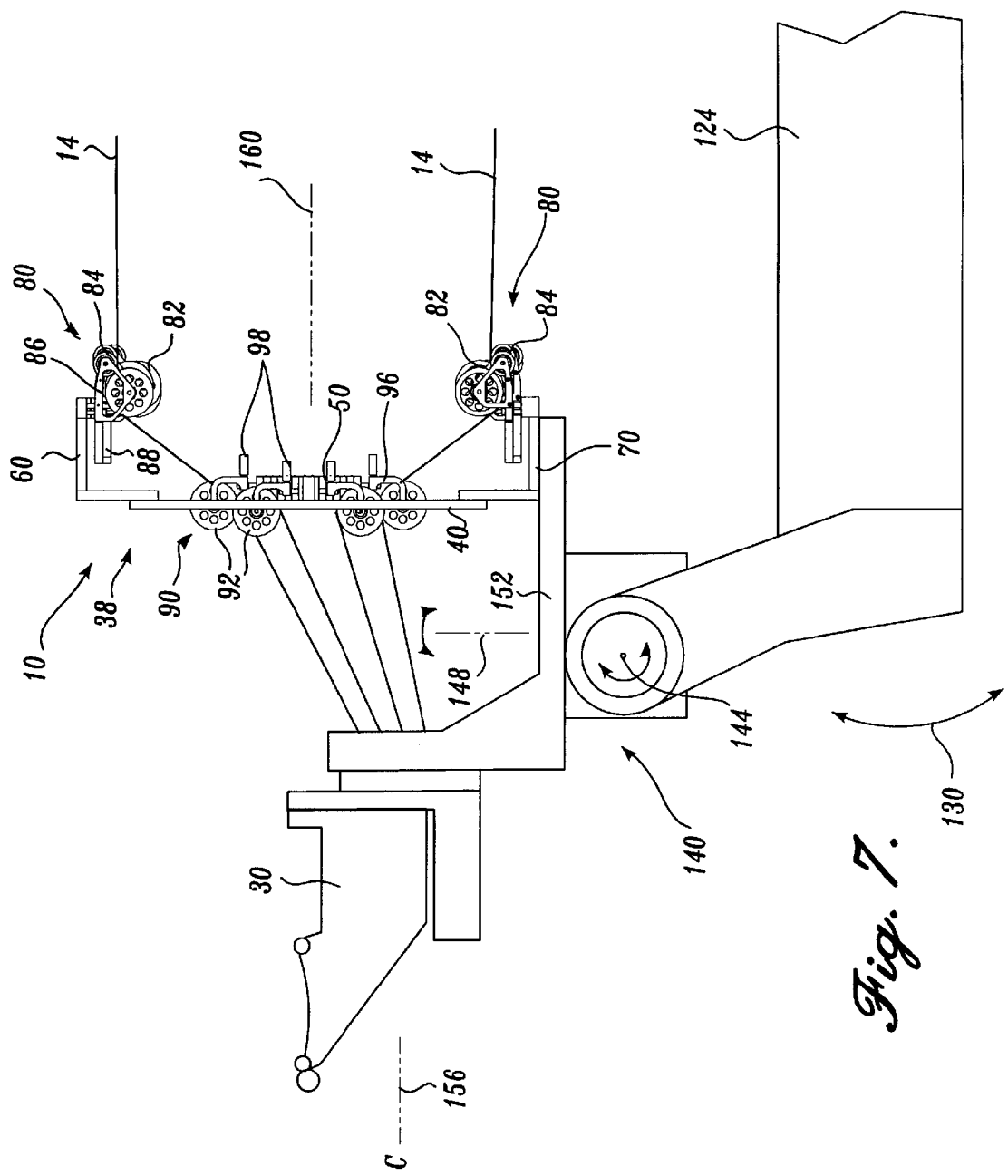

FIBER PLACEMENT MID-SPAN REDIRECT

FIELD OF THE INVENTION

The present invention relates to machines for use in composite fiber placement manufacturing of aircraft and missile mold line parts. More specifically, this invention relates to a device that directs composite fiber tows from the material supply to the fiber placement head that places the tows onto the part mold.

BACKGROUND OF THE INVENTION

Fiber placement is a process where a band, made up of several strips of composite fiber "tows", is automatically placed onto the surface of a mandrel or a workpiece that is molded into the shape of the composite part to be formed. The band is applied to the surface being fabricated and is compacted by a compliant pressure roller "head" under program control to remove the bulk. Critical to the success of the fiber placement process is the path of the tows from the material supply "creel" to the nip point "collation surface." If the composite tows are allowed to become twisted while traveling from the creel to the head, tow twist defects will result, which dramatically reduces the quality of the formed composite parts. Thus, in an effort to prevent tow twists and other composite forming defects from occurring, redirect devices have been implemented that help to keep individual incoming composite tows straight and separated from one other.

However, when fiber placement techniques are utilized to produce parts having highly contoured surfaces, as is required for complex contoured parts and fiber steering, the redirect device must ideally allow the tows to move freely towards the creel (backwards) as well as towards the collation surface (forwards), accommodate for the relative motion between the head and the creel of a six axes of motion fiber placement assembly, and contain the tows for efficient machine operation. Additionally, during the fiber placement forming process the fiber placement head initially makes contact with the collation surface and causes the head to retract slightly, which moves the fiber material backwards towards the creel due to a shortening of the distance between the fiber placement head and the creel. While current devices accommodate many machine motions, they do not allow the tows to move freely in both directions (towards the nip point and towards the creel) nor do they contain the tows well enough to allow for efficient machine operation. Thus, when the necessary backward motion is attempted with existing redirects, twisting of the composite tows frequently occurs, resulting in large amounts of tow twist defects in the formed composite parts. Such occurrences dramatically reduce part quality and machine productivity.

Previous fiber placement redirects, such as those issued to Vaniglia (U.S. Pat. Nos. 4,872,619 and 4,877,193), Steidle et al. (U.S. Pat. No. 5,239,193), and Grimshaw et el. (U.S. Pat. No. 5,273,614), all utilize rollers that can only compensate for one degree of freedom at a time. As a result, three sets of rollers would be needed to compensate for the three axes (yaw, pitch, and roll) that are utilized by a fiber placement head that moves subject to six axes of machine motion. Fiber placement heads that move in this manner are required for the production of some modern aerospace structures that have highly contoured surface configurations. Further, the previously mentioned fiber placement redirect devices are all designed to be utilized in conjunction with a gantry style placement head machine which is fundamentally different from the type of fiber placement assembly utilized with the present invention. In addition, none of the previously mentioned fiber placement redirect devices sufficiently accomodate bi-directional tow movement which is critical in producing highly contoured parts without tow twist defects. Thus, there is a continuing need for a fiber placement redirect that allows for bi-directional tow movement, can accommodate six axes of machine motion, and can contain the tows for efficient machine operation.

SUMMARY OF THE INVENTION

The present invention is directed towards a mid-span redirect device that guides composite material tows along a fiber path from a material supply creel to a fiber placement head within a fiber placement assembly (accomodating for the relative motion between the head and the creel) during a composite material forming process. The mid-span redirect device includes a plurality of outer swivel roller assemblies that are configured to direct and contain fiber tows received from the creel, as well as minimize tow friction caused by changes in the fiber path. The device also includes a plurality of inner swivel roller assemblies that are designed to direct and engage fiber tows received from the outer swivel roller assemblies, and minimize tow friction caused by changes in the fiber path. A frame assembly connects the plurality of outer swivel roller assemblies to the inner swivel roller assemblies.

In a preferred embodiment of the present invention, the outer swivel roller assemblies and inner swivel roller assemblies work in concert with one another to accommodate for the relative motion between the head and the creel of a six axes of motion fiber placement assembly, while simultaneously allowing the tows to move bi-directionally, both towards the material supply creel and towards the fiber placement head. The mid-span redirect device itself, also moves through six axes of motion during the forming process. The plurality of outer swivel roller assemblies each contains an outer roller, a corresponding capture roller, an outer swivel bracket assembly, and a counterbalancing member. The plurality of inner swivel roller assemblies each contain an inner roller, an inner swivel bracket assembly, and a counterbalancing member.

Further, all of the inner and outer rollers are ultra light weight to facilitate bi-directional rotation, and thereby accommodate bi-directional tow movement. The inner and outer rollers are also grooved, and have a roller groove width and depth that are configured to accommodate variations in fiber tow width, thickness, and modulus. The inner and outer swivel bracket assemblies are mounted for free, unpowered rotation so that the inner and outer swivel bracket assemblies can rotate freely in response to urging from the material tows. The inner and outer swivel roller assemblies are adjustably counter-balanced by counterbalancing members that are tunable to the final roller assembly mass and center of gravity, thereby minimizing tow friction caused by changes in the fiber path from the creel to the head. The tows are held by the creel in extremely low tension, which prevents the release of excess tow length from the creel during the forming process.

Each material tow travels along the fiber path from the material supply creel, between an outer roller and a corresponding capture roller of the outer swivel roller assembly, over an inner roller of the inner swivel roller assembly, and into the fiber placement head. The number of inner swivel roller assemblies is equal to the number of outer swivel number assemblies. The frame assembly includes an upper and a lower outer roller frame, an inner roller frame, and a support frame. Each inner and outer swivel roller assembly is detachable from the frame assembly and is positionally adjustable within the frame assembly.

As incorporated in one fiber placement assembly, a fiber placement head, material supply creel, mid-span redirect device, three axes wrist, and crane-arm boom are all positionally linked in two-dimensional translational movement within a substantially horizontal plane by a base assembly. The fiber placement head, mid-span redirect device, and three axes wrist are operatively associated with the crane-arm boom, and are positionally linked in polar translational movement within a substantially vertical plane swept out by the rotation of the crane-arm boom about a pivot point. The fiber placement head and the mid-span redirect device are connected to the three axes wrist, rotate in positionally linked pitch and yaw movements, and rotate in positionally related roll movements.

The fiber placement mid-span redirect of the present invention has demonstrated the capability to accommodate for the relative motion between the head and the creel of a six axes of motion fiber placement assembly, while simultaneously allowing the fiber tows to move in both directions. This is accomplished using a unique swivel roller design that accommodates variations in fiber path, tow width, and tow direction; ultra lightweight, counter-balanced rollers to engage and contain fiber tows following various fiber paths and minimize tow friction caused by changes in the fiber path through machine motion; and a novel frame construction for containing all fiber tows during machine operation. During fiber placement along highly contoured paths, the distance between the head and the creel changes, which requires that the material move backward from the head toward the creel. The unique configuration of the rollers in the present invention allows for extreme head axis positioning without inducing tow twists (which are the most common defect in fiber placement using present art techniques). Further, the configuration of the swivel roller assemblies in the present invention allows only two sets of swivel roller assemblies to compensate for the three axes (yaw, pitch, and roll) of rotational motion utilized by a fiber placement head.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7 illustrates a side view of the redirect device of the present invention, with a fiber placement head, a three axes wrist, and a crane-arm boom.

DETAILED DESCRIPTION OF THE PREFERRED EMBODIMENT

Figure 1:
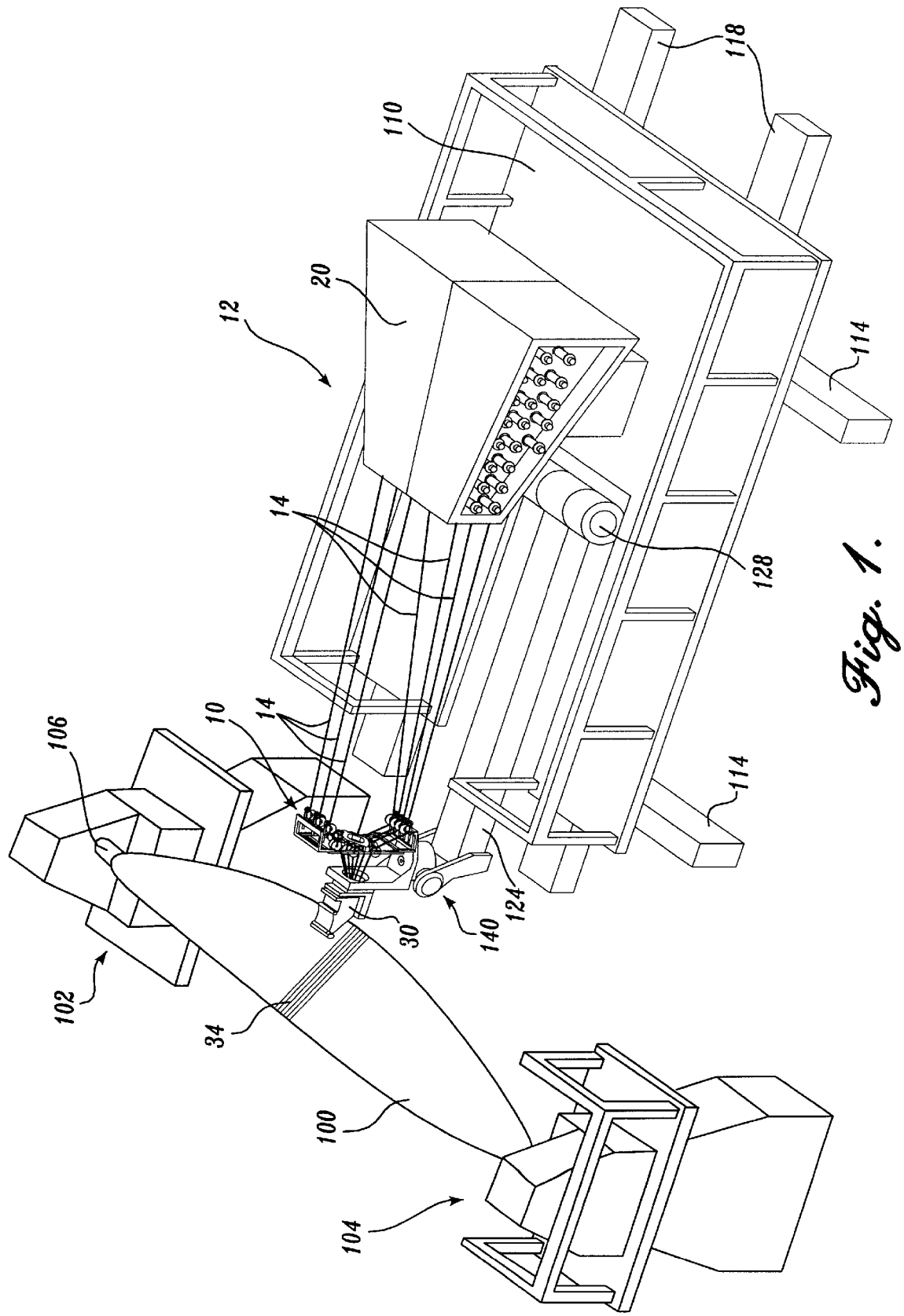
FIG. 1 illustrates an environmental perspective view of the fiber placement mid-span redirect of the present invention in conjunction with a fiber placement assembly system, including a fiber placement head, a three axes wrist, a crane-arm boom, a creel assembly, a collation surface workpiece, and a workpiece support tool.

FIG. 1 illustrates a preferred embodiment of a composite fiber placement mid-span redirect device 10 constructed in accordance with the present invention and mounted on a fiber placement assembly 12, that guides a plurality of composite material tows 14 along a fiber path from a material supply creel 20 to a fiber placement head 30, while accommodating for the relative motion between the head 30 and the creel 20 during the process of forming a composite part 34. Briefly described, the mid-span redirect device 10 illustrated in FIGS. 2–4, includes a frame assembly 38 to which a plurality of outer swivel roller assemblies 80 and a plurality of inner swivel roller assemblies 90 are attached. Each outer swivel roller assembly 80 contains an outer roller 82, an outer capture roller 84, an outer swivel bracket assembly 86, and a counterbalancing member 88. Each inner swivel assembly 90 contains an inner roller 92, an inner swivel bracket assembly 96, and a counterbalancing member 98. The redirect device 10 contains an equal number of outer swivel assemblies 80 and inner swivel assemblies 90 which work in concert with one another to accommodate for the relative motion between the head 30 and the creel 20 of a six axes of motion fiber placement assembly 12, and simultaneously allow the fiber tows 14 to move bi-directionally, both towards the material supply creel 20 and alternately towards the fiber placement head 30, without inducing twisting of the fiber tows 14 (tow twist defects).

The mid-span redirect device 10, shown in isolation in FIGS. 2–4, now will now be described in detail. Referring to these figures, it can be seen that the frame assembly 38 actually contains a support frame 40, an inner roller frame 50, an upper outer roller frame 60, and a lower outer roller frame 70. This modular design allows individual sections of the frame assembly 38 to be removed and replaced for ease of repair and/or maintenance. The support frame 40 is basically an upright rectangle in shape, containing right and left longitudinal members 42 and 44, and upper and lower transverse members 46 and 48.

The inner roller frame 50 contains a hollow, approximately elliptical shaped portion 52 with right and left tabs 54 and 56 extending from the acutely curved ends of the elliptical shaped portion 52. The inner roller frame 50 is attached approximately to the mid-points of the longitudinal members 42 and 44 of the support frame 40 at the outwardly extending tabs 54 and 56 of the inner roller frame 50. The upper and lower surfaces of the inner roller frame 50 each contain numerous apertures 58 for mounting the inner swivel bracket assemblies 96. The apertures 58 are arranged on the upper and lower surfaces of the inner roller frame 50 in an offset "indexed" configuration to enhance swivel clearance of the inner swivel roller assemblies 90. For ease of illustration FIGS. 2–4 each only show four upper/inner swivel roller assemblies and four lower/inner swivel roller assemblies. During operation, usually each of the apertures 58 on the upper and lower surfaces of the inner roller frame 50 (thirty-two in the present embodiment) mount an inner swivel bracket assembly 96. In an another embodiment of the present invention, the inner roller frame 50 could contain any number of apertures 58 to mount a corresponding number of inner swivel bracket assembly 96.

The upper outer roller frame 60 attaches adjacent to the upper corners of the support frame 40, and the lower outer roller frame 70 attaches adjacent to the lower corners of the support frame 40. Each outer roller frame 60 and 70 contains a right attachment arm 62 and 72, and a left attachment arm 63 and 73, which orthogonally connect to a rectangular section 65 and 75 of the frame 60 and 70. The upper right and left attachment arms 62 and 63 lie in a plane that is parallel to the plane formed by the support frame 40, and perpendicular to plane formed by the rectangular section 65 of the upper outer roller frame 60, to which the attachment arms are connected. The upper outer roller frame 60 and the lower outer roller frame 70 are both configured in the same shape and are secured to opposite ends of the support frame 40 such that the frames 60 and 70 mirror each other. The upper and lower outer roller frames 60 and 70 extend upward and downward, respectively, from the support frame 40.

The rectangular sections 65 and 75 of the upper and lower outer roller frames 60 and 70 contain inboard connecting arms 67 and 77, and outboard connecting arms 68 and 78, which run parallel to the transverse members 46 and 48 of the support frame 40. Specifically, the attachment arms 62 and 63 of the upper outer roller frame 60 secure to the inboard connecting arm 67 of the rectangular section 65, and attachment arms 72 and 73 of the lower outer roller frame 70 secure to the inboard connecting arm 77 of the rectangular section 75.

Figure 2:
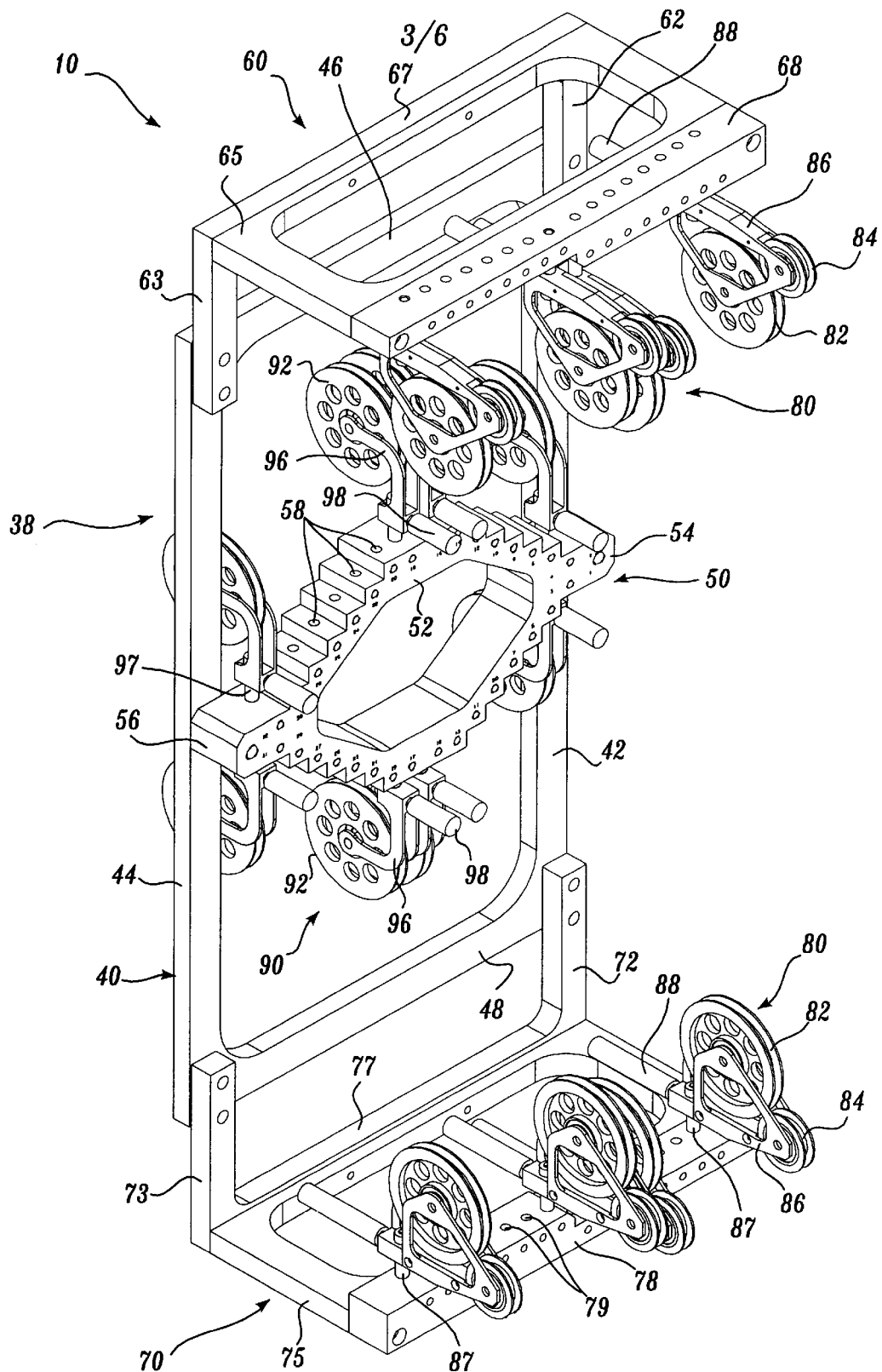
FIG. 2 illustrates a perspective view of the fiber placement mid-span redirect shown in FIG. 1.

The lower surface of the upper outer roller frame 60 outboard connecting arm 68, and the upper surface of the lower outer roller frame 70 outboard connecting arm 78 each contain numerous apertures 79 (shown only on the outboard connecting arm 78 in FIG. 2, but are shaped and spaced in substantially the same manner on the underside of the outboard connecting arm 68). The apertures are for mounting the outer swivel bracket assemblies 86. The apertures 58 are arranged on the lower surface of the upper outer roller frame 60 outboard connecting arm 68 and the upper surface of the lower outer roller frame 70 outboard connecting arm 78 in an offset "indexed" configuration to enhance swivel clearance of the outer swivel roller assemblies 80. As most clear shown in FIG. 4, the lower surface of the upper outer roller frame 60 outboard connecting arm 68 and the upper surface of the lower outer roller frame 70 outboard connecting arm 78 are "stepped" at approximately their midpoints. This step enhanced the swiveling ability of the outer swivel roller assemblies 80 by increasing the clearance between the counterbalancing members 88 of the assemblies 80.

Figure 3:
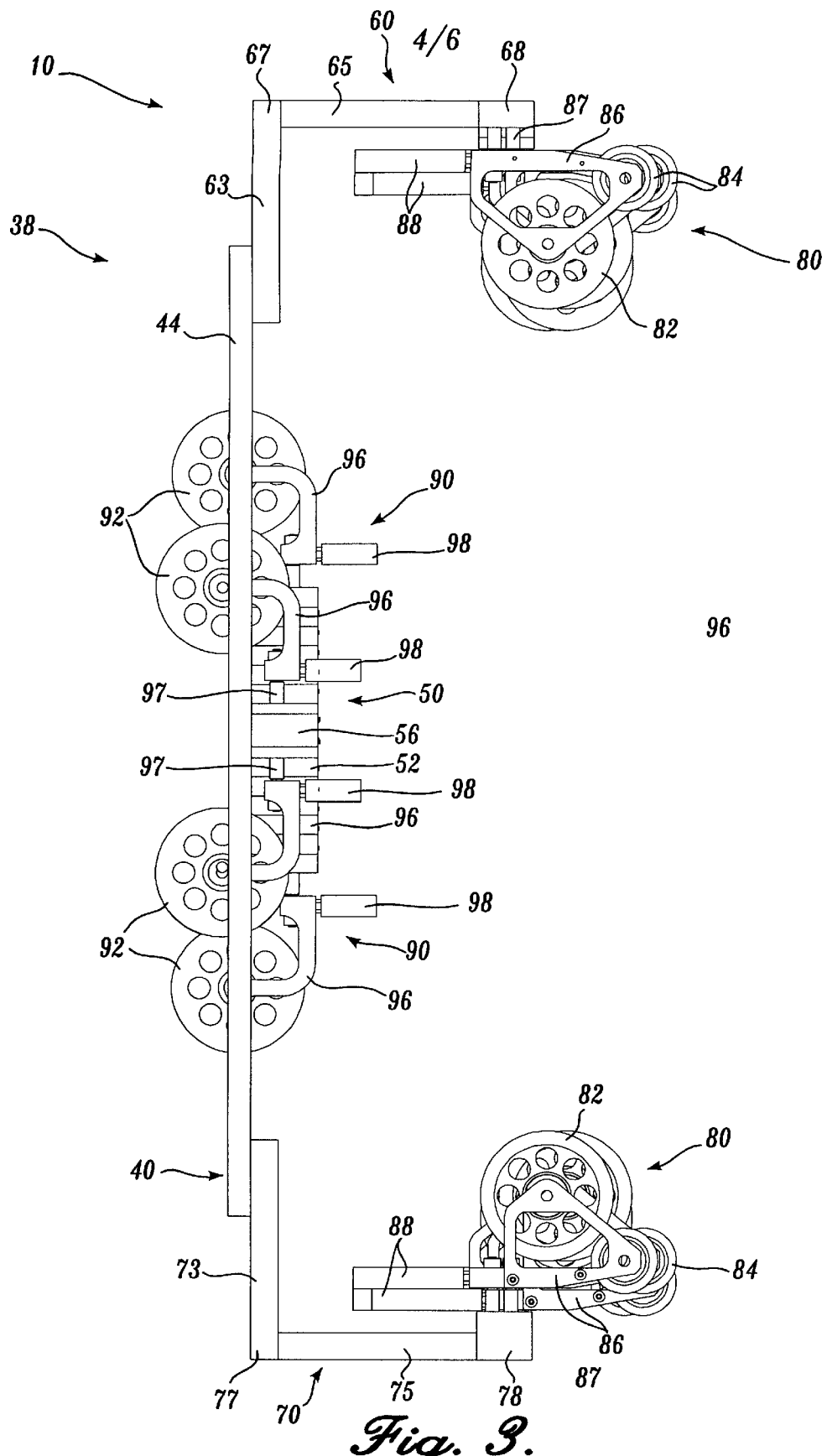
FIG. 3 illustrates a side view of the fiber placement mid-span redirect shown in FIG. 1.
Figure 4:
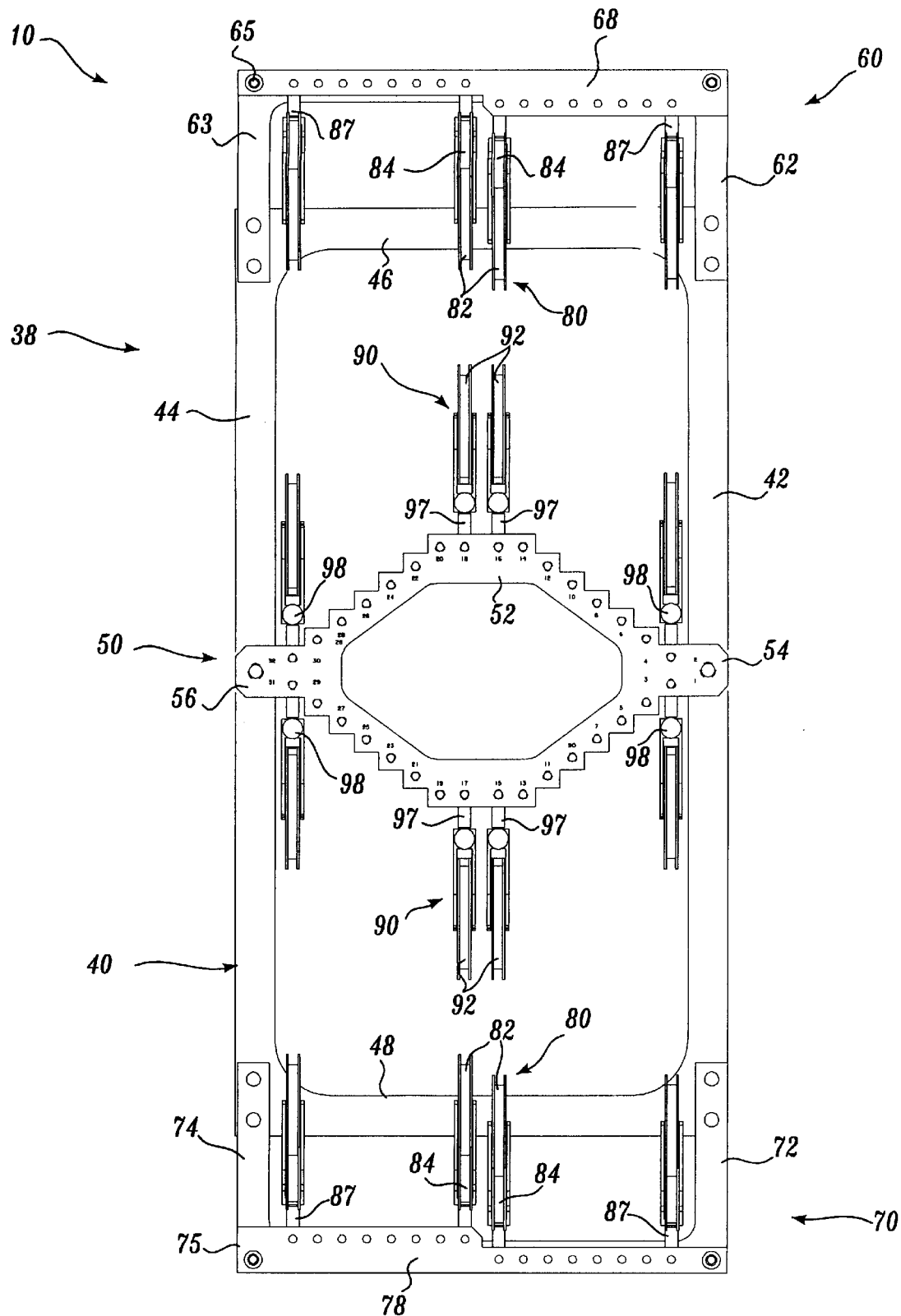
FIG. 4 illustrates a front view of the fiber placement mid-span redirect shown in FIG. 1.

For ease of illustration, FIGS. 2–4 each only show four upper/outer swivel roller assemblies and four lower/outer swivel roller assemblies. During operation, usually each of the apertures 79 on the lower surface of the upper outer roller frame 60 outboard connecting arm 68 and the upper surface of the lower outer roller frame 70 outboard connecting arm 78 (thirty-two in the present embodiment) mount an outer swivel bracket assemblies 86. In an another embodiment of the present invention, the upper and lower outer roller frames 60 and 70 could contain any number of apertures 79 to mount a corresponding number of outer swivel bracket assembly 86.

Figure 5:
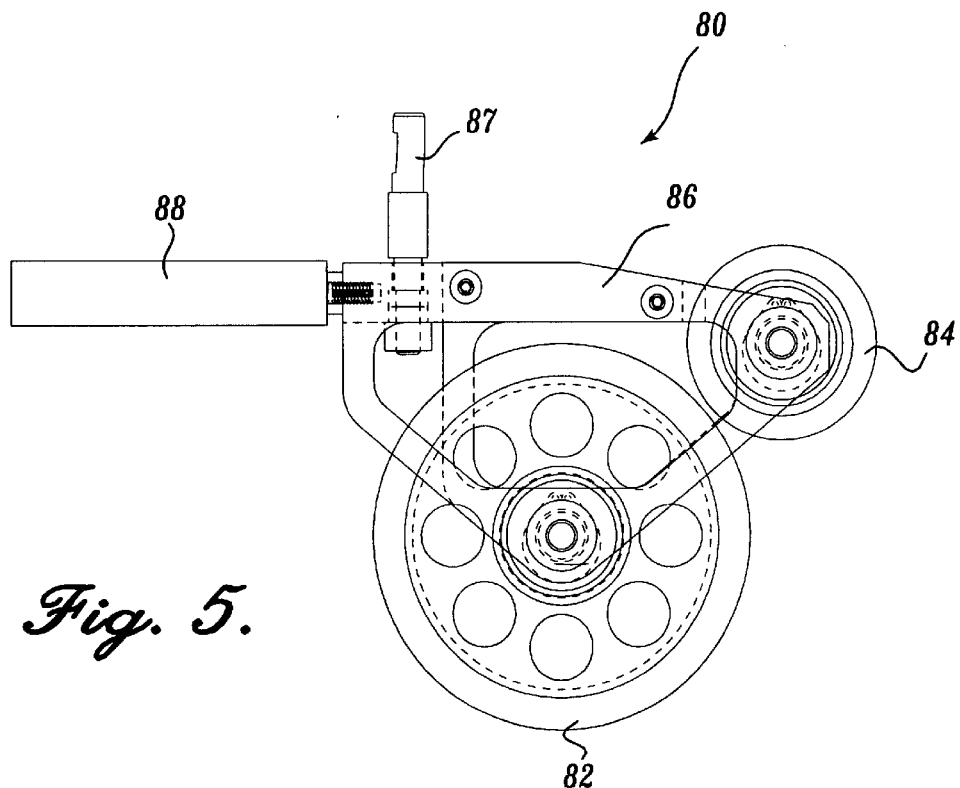
FIG. 5 illustrates a side view of the swivel, counter-balanced roller bracket assembly component of the fiber placement mid-span redirect of the present invention.
Figure 6:
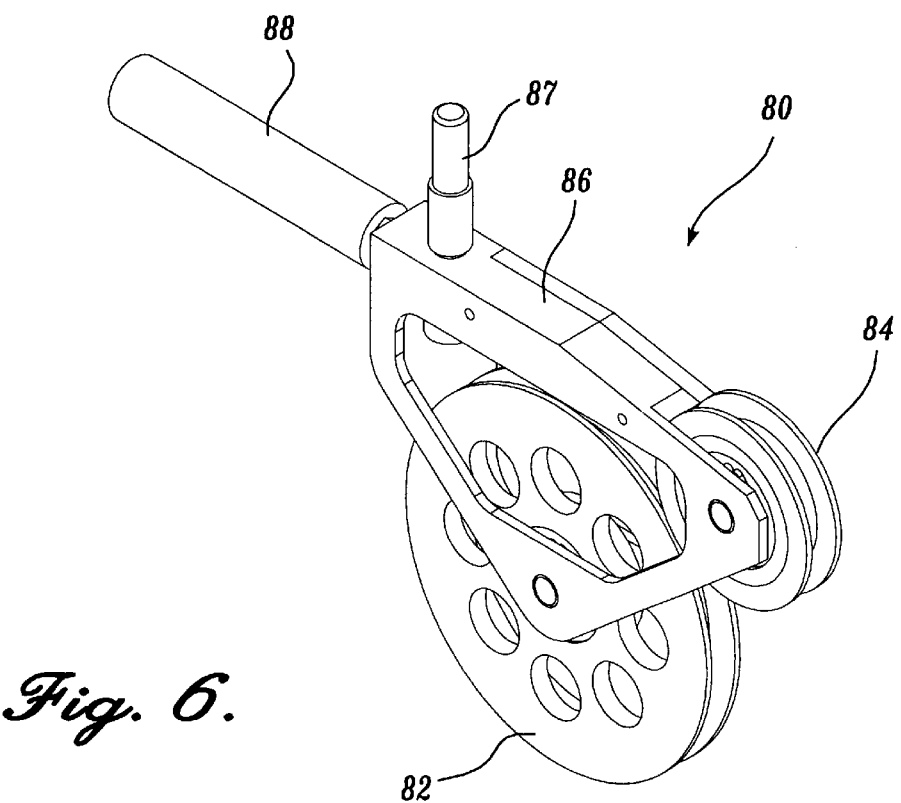
FIG. 6 illustrates a perspective view of the swivel, counter-balanced roller bracket assembly component of the fiber placement mid-span redirect shown in FIG. 5.

FIGS. 5 and 6 illustrate close-up views of an outer swivel roller assembly 80 containing an outer roller 82, an outer capture roller 84, an outer swivel bracket assembly 86, and a counterbalancing member 88. As can be readily seen in FIGS. 5 and 6, the outer rollers 82 are substantially larger than the outer capture rollers 84. Each outer roller 82 and outer capture roller 84 are rotatably connected about their axes to their respective outer swivel bracket assembly 86. Each outer roller 82 and outer capture roller 84 are positioned in relation to one another such that an incoming fiber tow 14 is directed and contained between the outer roller 82 and outer capture roller 84. To further aid in containment and separation of incoming fiber tows 14, the outer rollers 82 and outer capture rollers 84 are also journaled. This journaled outer groove in each roller is of a width and depth designed to accommodate for variations in fiber tow width, thickness, and modulus. Additionally, the outer rollers 82 and outer capture rollers 84 are all ultra lightweight, having significantly reduced mass. Employing ultra lightweight outer rollers 82 and outer capture rollers 84 facilitates bi-directional (forward and backward) rotation of the rollers, by decreasing the resistance that the rollers present against continual incremental modifications to the fiber path of the incoming fiber tows 14 which seek to reorient the rollers.

As well as rotatably mounting the outer rollers 82 and outer capture rollers 84, the outer swivel bracket assemblies 86 further contain swivel mount members 87, and also selectively secure counterbalancing members 88. The swivel mount member 87 of each outer swivel bracket assembly 86 is fixed in an aperture 79 within the upper outer roller frame 60 or lower outer roller frame 70, and contains an integral swivel mechanism. The axis of rotation of each swivel mount member 87 is perpendicular to the axes of rotation of the outer roller 82 and outer capture roller 84 of each respective roller assembly 80. Further, the axis of rotation of each swivel mount member 87 is vertically tangent to the journaled groove of the respective outer roller 82 of the assembly 80, on the side of the roller 82 nearest to the inner swivel roller assemblies 90. Having the point of swivel rotation of the outer roller assemblies 80 tangent to the inner roller side/journaled groove of each outer roller 82 facilitates maintaining proper allignment of the fiber tows 14 between the outer rollers 82 and the inner rollers 92 during swiveling of the outer and inner roller assemblies 80 and 90.

Preferably, the securement of each counterbalancing member 88 to its respective outer swivel bracket assembly 86 is adjustable. This allows the counterbalancing members 88 to be fine tuned in order to precisely counterbalance the outer swivel roller assemblies 80 to the final roller assembly mass and center of gravity, and in this manner minimize swivel friction caused by changes in the fiber path. A preferred method for achieving adjustable securement of the counterbalancing members 88 to the outer swivel bracket assemblies 86 is to have a protrusion at one end of the counterbalancing members 88 threaded to screw into a correspondingly threaded orifice in the outer swivel bracket assembly 86. The counterbalancing member 88 can then be rotated to move its center of mass either closer or further away from the outer swivel bracket assembly 86. The inner swivel roller assemblies 90 are quite similar to the outer swivel roller assemblies 80 in both configuration and function, with the main difference being that the inner swivel roller assemblies 90 do not contain capture rollers. As shown in FIGS. 2–4, the inner swivel roller assemblies 90 mount in the aperture 58 on the upper and lower surfaces of the inner roller frame 50. The apertures 58 are shown only on the upper surfaces of the inner roller frame 50 in FIG. 2, but are shaped and spaced in substantially the same manner on the underside of the inner roller frame 50 as well. Each inner roller assembly 90 contains an inner roller 92, an inner swivel bracket assembly 96, and a counterbalancing member 98, but no capture roller such as is contained in an outer swivel roller assembly 80.

The inner rollers 92 of the inner swivel roller assemblies 90 are substantially the same in shape and size as the outer roller 82 of the outer swivel roller assemblies 80. Each inner roller 92 is rotatably connected about its axis to its respective inner swivel bracket assembly 96. Since the inner swivel roller assemblies 90 do not contain a capture roller, the inner swivel bracket assembly 96 can be of a much simpler configuration, such as a curved arm, to rotatably support a single inner roller 92, as shown in FIGS. 2 and 3. Like the outer rollers 82, the inner rollers 92 are also journaled to aid in containing and separating the incoming fiber tows 14 to accommodate changes in the fiber paths. The outer groove in each inner roller 92 is also of a width and depth configured to accommodate for variations in fiber tow, width, thickness, and modulus. Finally, the inner rollers 92 are also of the same ultra lightweight construction as the outer roller 82 in order to achieve the same benefits in facilitating bi-directional rotation of the rollers.

The simplified curved arm design of the inner swivel bracket assemblies 96 contains swivel mount members 97, and also secures counterbalancing members 98. The swivel mount member 97 of each inner swivel bracket assembly 96 is fixed in an aperture 58 on the upper or lower surface of the inner roller frame 50 and contains an integral swivel mechanism. The axis of rotation of the swivel mount member 97 is perpendicular to the axis of rotation of the inner roller 92 within its respective inner swivel roller assembly 90. Further, the axis of rotation of each swivel mount member 97 is vertically tangent to the journaled groove of the respective inner roller 92 of the assembly 90, on the side of the roller 92 nearest to the outer swivel roller assemblies 80. Having the point of swivel rotation of the inner roller assemblies 90 tangent to the outer roller side/journaled groove of each inner roller 92 facilitates maintaining proper allignment of the fiber tows 14 between the outer rollers 82 and the inner rollers 92 during swiveling of the outer and inner roller assemblies 80 and 90. Preferably, the counterbalancing member 98 of each inner swivel roller assembly 90 is adjustable, in order to tunably counterbalance each individual inner swivel roller assembly 90 in the same manner as the counterbalancing members 88 of the outer swivel roller assemblies 80.

Both the outer and inner swivel roller assemblies 80 and 90 are unpowered, allowing all parts of the assemblies to move freely in response to urgings from the fiber tows 14 resulting from changes in the fiber path due to relative motion between the head 30 and the creel 20. Specifically, all of the swivel mount members 87 and 97 rotate freely within their respective apertures 79 and 58. This free rotational ability is greatly enhanced by the counterbalancing members 88 and 98 which are fine-tuned to produce substantially perfectly balanced roller assemblies 80 and 90. The ultra lightweight, reduced mass design of the outer rollers 82, outer capture rollers 84, and inner rollers 92 enhance the compensation abilities of the unpowered, freely rotatable rollers. The fiber tows 14 are held by the creel under an extremely low amount of tension which prevents excess tow length from being prematurely released from the creel 20 during the forming process, yet does not interfere with the fiber path compensation abilities of the mid-span redirect device 10.

Referring again to FIG. 1, the operation of the mid-span redirect device 10 in connection with the operation of the entire fiber placement assembly 12 will now be discussed. Each composite material fiber tow 14 travels along a fiber path from the material supply creel 20 to the mid-span redirect device 10, where each fiber tow 14 passes between an outer roller 82 and a corresponding capture roller 84 in the outer swivel roller assembly 80, and then is directed over an inner roller 92 of an inner swivel roller assembly 90. After passing through the mid-span redirect 10, the fiber tows 14 continue into the fiber placement head 30 where the tows 14 are consolidated and compacted on a workpiece 100 to produce a formed part 34. The redirect device 10 accommodates for the relative motion between the head 30 and the creel 20 of the six axes of motion fiber placement assembly 12. Further, the configuration of the outer and inner swivel roller assemblies 80 and 90 of the redirect device 10 allows only two sets of swivel roller assemblies to compensate for the three axes (yaw, pitch, and roll) of rotational motion utilized by the fiber placement head 12. As shown in FIG. 1, the workpiece 100 is suspended between a first and second support tower 102 and 104 by a workpiece axis 106.

To implement advanced composite technologies and form large highly contoured composite part surfaces, a complex fiber placement assembly 12 and dual tower 102 and 104 supported forming workpiece 100, such as the arrangement shown in FIG. 1 are often needed. The fiber placement assembly 12, produces six axes of motion to allow for extreme fiber placement head axis positioning which is required for efficient production of complex contoured parts. This in turn produces relative motions between the fiber placement head 30 and the material supply creel 20 which are complex, and have traditionally resulted in a large amount of the incoming fiber tows 14 becoming twisted somewhere along their path from the material supply creel 20 to the fiber placement head 30. Prior redirect devices have been unsuccessful in satisfactorily preventing tow twist defects from occurring. However, the unique combination of unpowered, ultra lightweight, swivel counterbalanced rollers and bracket assemblies of the mid-span redirect device 10 of the present invention has proved successful in substantially eliminating tow twists.

Referring now to FIGS. 1 and 7, a fiber placement assembly 12 that produces the types of motions that necessitate the need for the mid-span redirect device 10 of the present invention, will be examined in more detail. The present invention is directed only towards the mid-span redirect device 10 and not towards the below-described fiber placement assembly 12. The following description of the fiber placement assembly 12 and its interaction with the mid-span redirect device 10 is provided only to help clarify and provide an exemplary illustration of the type of complex forming assembly movements that the redirect device 10 is designed to accommodate. The redirect device 10 can be used in conjunction with many other various types of composite forming apparatus without departing from the scope of the present invention.

As shown in FIG. 1, the creel 20 containing the wound fiber placement tows 14 is mounted on a large base assembly 110. The entire base assembly 110 in turn rests upon two sets of perpendicularly intersecting tracks. The Z-directional tracks 114 move the entire base assembly 110 side to side in relation to the tower suspended workpiece 100. The X-directional tracks 118 move the entire base assembly 110 both towards and away from the workpiece 100. Thus, the base assembly 110 can move within a two-dimensional substantially horizontal plane.

Connected to the base assembly 110 is a crane arm boom 124. Specifically, the crane arm boom 124 is rotatably connected to the base assembly 110 by a pivot joint 128. The crane arm boom 124 rotates in a circular motion about the pivot joint 128 within a vertical plane. The path swept out by the unfixed end of the crane arm boom 124 within the vertical plane is designated the J-axis 130. In this manner, three axes of translational movement are produced by the base assembly 110 through the Z and X directional tracks 114 and 118, and the pivotal crane arm boom 124.

As more clearly shown in FIG. 7, a three-axis wrist 140 is attached to the unfixed end of the crane arm boom 124. The fiber placement head 30 and mid-span redirect 10 are in turn attached to the three-axis wrist 140. The forward end of the fiber placement head 30 can be rotationally pitched downwards or upwards by rotating the three-axis wrist 140 about its pitch rotational E-axis 144. Since the mid-span redirect device 10 is operatively connected to the wrist surface 152 of the three-axis wrist 140, the redirect device 10 directly follows the pitch rotational movements of the fiber replacement head 30. The redirect device 10 accomodates the fiber path of the tows 14 by compensating for changes in the pitch (E-axis) and boom (J-axis) rotation between the head 30 and the creel 20 through variations in the wrap angle of the tows 14 around the capture rollers 84.

The fiber placement head 30 can be rotationally yawed from side to side about a vertical axis by rotating the three-axis wrist 140 about its yaw rotational B-axis 148. Since the mid-span redirect 10 is operatively connected to the wrist surface 152 of the three-axis wrist 140, the redirect device 10 also directly follows the yaw rotational movement of the fiber placement head 30. The redirect device 10 accomodates the fiber path of the tows 14 by compensating for the relative yaw (B-axis) rotation between the head 30 and the creel 20 through swiveling the roller assemblies 80 and 90 about the swivel mount members 87 and 97.

The fiber placement head 30 can achieve roll rotational movement by rotating a portion of the three-axis wrist 140 about its roll rotational A-axis 156. Referring closely to FIG. 7, it can be seen that the roll rotational A-axis 156 of the three-axis wrist 140 does not cause roll rotation of the wrist surface 152 to which the mid-span redirect device 10 is operatively connected. Thus, the mid-span redirect device 10 does not directly follow the roll rotational movement of the fiber placement head 30. However, the mid-span redirect 10 is connected to its own slaved roll rotational A-axis 160, which is motorized and servo controlled to follow predetermined percentage components of the rotational movement produced by the roll rotational A-axis 156 of the three-axis wrist 140 and thus, accomodate the relative roll (A-axis) rotational motion between the head 30 and the creel 20.

Therefore, the fiber placement head 30, the material supply creel 20, the mid-span redirect device 10, the three-axis wrist 140, the crane arm boom 124, and the base assembly 110 are all positionally linked in two-dimensional translational movement within a substantially horizontal X-Z plane. In further connection, the fiber placement head 30, the mid-span redirect device 10, and the three-axis wrist are all operatively associated with the crane arm boom 124, and thus are positionally linked in polar translational curved movement within a substantially vertical plane swept out by the rotation of the crane arm boom 124 about its pivot joint 128 on the base assembly 110. The fiber placement head 30 and the mid-span redirect device 10 are positionally linked in rotational movement by the three-axis wrist 149 in direct relationship through pitch and yaw rotational movements, and partially linked in percentage slaved roll rotational movements. The redirect device 10 of the present invention compensates for the relative movements created between the fiber placement head 30 and the material supply creel 20 due to differences in the rotational and translational linkage of the head 30 and creel 20, thereby reducing tow twists and other producability defects.

The present invention has been described in relation to a preferred embodiment and several alternate preferred embodiments. One of ordinary skill, after reading the foregoing specification, may be able to affect various other changed, alterations, and substitutions or equivalents thereof without departing from the concepts discloses. It is therefore intended that the scope of the letters patent granted hereon be limited only by the definitions contained in the appended claims and equivalents thereof.

The embodiments of the invention in which an exclusive property or privilege is claimed are defined as follows:

1. A redirect device that guides composite material tows along a fiber path from a material supply creel to a fiber placement head within a fiber placement assembly during a composite material forming process, the device comprising:
   (a) a frame assembly;
   (b) a plurality of outer swivel roller assemblies operatively connected to the frame assembly, wherein the outer swivel roller assemblies are configured to direct and contain fiber tows, and minimize tow friction caused by changes in the fiber path, the outer roller assemblies being rotatable about respective axes independently of each other;
   (c) a plurality of inner swivel roller assemblies operatively connected to the frame assembly, wherein the inner swivel roller assemblies are configured to minimize tow friction caused by changes in the fiber path;
   whereby each of the material tows follows a tow routing arrangement along a fiber path from the material supply creel, engaging an outer swivel roller assembly, engaging an inner swivel roller assembly, and traveling into the fiber placement head.

2. The device of claim 1, in which the outer roller assemblies are individually adjustably counterbalanced relative to the frame.

3. A redirect device that guides composite material tows along a fiber path from a material supply creel to a fiber placement head within a fiber placement assembly during a composite material forming process, the device comprising:
   (a) a frame assembly;
   (b) a plurality of outer swivel roller assemblies operatively connected to the frame assembly, wherein the outer swivel roller assemblies are configured to direct and contain fiber tows, and minimize tow friction caused by changes in the fiber path, the outer roller assemblies being individually adjustably counterbalanced relative to the frame;
   (c) a plurality of inner swivel roller assemblies operatively connected to the frame assembly, wherein the inner swivel roller assemblies are configured to minimize tow friction caused by changes in the fiber path;
   whereby each of the material tows follows a tow routing arrangement along a fiber path from the material supply creel, engaging an outer swivel roller assembly, engaging an inner swivel roller assembly, and traveling into the fiber placement head.

4. A redirect device that guides composite material tows along a fiber path from a material supply creel to a fiber placement head within a fiber placement assembly during a composite material forming process, the device comprising:
   (a) a frame assembly;
   (b) a plurality of outer swivel roller assemblies operatively connected to the frame assembly, wherein the outer swivel roller assemblies are configured to minimize tow friction caused by changes in the fiber path each of the inner swivel roller assemblies including:
       (i) an inner swivel bracket assembly; and
       (ii) an inner roller mounted on the inner bracket assembly for swinging movement of the inner swivel roller assemblies independently of each other;

whereby each of the material tows follows a tow routing arrangement along a fiber path from the material supply creel, engaging an outer swivel roller assembly, engaging an inner swivel roller assembly, and traveling into the fiber placement head.

5. A redirect device that guides composite material tows along a fiber path from a material supply creel to a fiber placement head within a fiber placement assembly during a composite material forming process, the device comprising:

(a) a frame assembly;

(b) a plurality of outer swivel roller assemblies operatively connected to the frame assembly, wherein the outer swivel roller assemblies are configured to direct and contain fiber tows, and minimize tow friction caused by changes in the fiber path; and (c) a plurality of inner swivel roller assemblies operatively connected to the frame assembly, wherein the inner swivel roller assemblies are configured to minimize tow friction caused by changes in the fiber path, each inner swivel roller assembly further comprising a counterbalance member, separate from the counterbalance members of the other inner swivel roller assemblies;

whereby each of the material tows follows a tow routing arrangement along a fiber path from the material supply creel, engaging an outer swivel roller assembly, engaging an inner swivel roller assembly, and traveling into the fiber placement head.

6. A redirect device that guides composite material tows along a fiber path from a material supply creel to a fiber placement head within a fiber placement assembly during a composite material forming process, the device comprising:

(a) a frame assembly;

(b) a plurality of outer swivel roller assemblies operatively connected to the frame assembly, wherein the outer swivel roller assemblies are configured to direct and contain fiber tows, and minimize tow friction caused by changes in the fiber path; and (c) a plurality of inner swivel roller assemblies operatively connected to the frame assembly, wherein the inner swivel roller assemblies are configured to minimize tow friction caused by changes in the fiber path, the inner swivel roller assemblies each being rotatable about an axis that is substantially tangential to the edge of an inner roller nearest to and associated with the outer swivel roller assemblies;

whereby each of the material tows follows a tow routing arrangement along a fiber path from the material supply creel, engaging an outer swivel roller assembly, engaging an inner swivel roller assembly, and traveling into the fiber placement head.

7. A redirect device that guides composite material tows along a fiber path from a material supply creel to a fiber placement head within a fiber placement assembly during a composite material forming process, the device comprising:

(a) a frame assembly;

(b) a plurality of outer swivel roller assemblies operatively connected to the frame assembly, wherein the inner swivel roller assemblies are configured to direct and contain fiber tows, and minimize tow friction caused by changes in the fiber path, each of the outer swivel roller assemblies including:

(i) an outer swivel bracket assembly;

(ii) an outer roller mounted on the outer swivel bracket assembly; and (iii) a capture roller mounted on the outer swivel bracket assembly adjacent to the outer roller that is arranged and configured so that a tow can be captured between the outer roller and the capture roller;

(c) a plurality of inner swivel roller assemblies operatively connected to the frame assembly, wherein the inner swivel roller assemblies are configured to minimize tow friction caused by changes in the fiber path;

whereby each of the material tows follows a tow routing arrangement along a fiber path from the material supply creel engaging an outer swivel roller assembly engaging an inner swivel roller assembly and traveling into the fiber placement head.

8. The device of claim 7, wherein the outer swivel roller assemblies and inner swivel roller assemblies work in concert with one another to accommodate six axes of motion from the fiber placement assembly, and simultaneously allow the tows to move bi-directionally, both towards the material supply creel and towards the fiber placement head.

9. The device of claim 8, wherein the redirect device is capable of moving through six axes of motion during the forming process.

10. The device of claim 7 wherein each of the outer swivel roller assemblies further comprises a counterbalance member mounted on the outer swivel bracket assembly.

11. The device of claim 10, wherein the counterbalance member is mounted on the outer swivel bracket assembly opposite the outer roller and the outer capture roller.

12. The device of claim 7, wherein each of the plurality of outer swivel roller assemblies is rotatable about an axis that is substantially orthogonal to the rotational axes of the outer roller and the capture roller, and the plurality of outer swivel roller assemblies being mounted for rotation about their respective axes independently of each other.

13. The device of claim 7, wherein the plurality of outer swivel roller assemblies are each rotatable about an axis that is substantially tangential to the edge of the outer roller nearest the inner swivel roller assemblies.

14. The device of claim 7, wherein the outer swivel bracket assemblies are mounted for free, unpowered rotation so that the outer swivel bracket assemblies can rotate freely in response to urging from the material tows.

15. The device of claim 7, wherein the outer swivel roller assemblies are individually adjustably counter-balanced by counterbalance members that are capable of being tuned to the final roller assembly mass and center of gravity, thereby minimizing tow friction caused by changes in the fiber path.

16. The device of claim 7, wherein the plurality of inner swivel roller assemblies each comprise:

(a) an inner swivel bracket assembly; and (b) an inner roller mounted on the inner swivel bracket assembly, for swiveling movement of the inner swivel roller assemblies independently of each other.

17. The device of claim 16, wherein the each inner swivel roller assembly further comprises a counterbalance member, separate from the counterbalance members of the other inner roller assemblies, mounted on the inner swivel bracket assembly.

18. The device of claim 17, wherein the counterbalance member is mounted on the inner swivel bracket assembly opposite an inner roller.

19. The device of claim 16, wherein the plurality of inner swivel roller assemblies are rotatable about an axis that is substantially orthogonal to the rotational axis of the inner roller.

20. The device of claim 16, wherein the plurality of inner swivel roller assemblies are each rotatable about an axis that is substantially tangential to the edge of the inner roller nearest the outer swivel roller assemblies.

21. The device of claim 16, wherein the inner swivel bracket assemblies are mounted for free, unpowered rotation so that the inner swivel bracket assemblies can rotate freely in response to urging from the material tows.

22. The device of claim 7, wherein the plurality of inner swivel roller assemblies are individually adjustably counter-balanced by counterbalance members that are capable of being tuned to the final roller assembly mass and center of gravity, thereby minimizing tow friction caused by changes in the fiber path.

23. The device of claim 7, wherein the number of inner swivel roller assemblies is equal to the number of outer swivel number assemblies.

24. The device of claim 7, wherein the inner and outer swivel roller assemblies are detachable from the frame assembly and positionally adjustable within the frame assembly.

25. A redirect device that guides fiber tows along a fiber path from a first location to a second location within a forming assembly during a forming process, the device comprising:
   a frame assembly;
   a plurality of outer swivel roller assemblies operatively connected to the frame assembly, wherein outer swivel roller assemblies are configured to engage and direct fiber tows received from a creel, each of the outer swivel roller assemblies including:
      (a) an outer swivel bracket assembly;
      (b) an outer roller mounted on the outer swivel bracket assembly; and
      (c) a capture roller mounted on the outer swivel bracket assembly adjacent to the outer roller that is arranged and configured so that a tow can be captured between the outer roller and the capture roller;
   a plurality of inner swivel roller assemblies operatively connected to the frame assembly, wherein the inner swivel roller assemblies are configured to engage and direct fiber tows received from the outer swivel roller assemblies; and
   wherein the device is configured to accommodate three axes of translational movement and three axes of rotational movement produced by at least a portion of the forming assembly during the forming process.

26. The device of claim 25, wherein the each outer swivel roller assembly further comprises a counterbalance member mounted on the outer swivel bracket assembly.

27. The device of claim 26, wherein the counterbalance member is mounted on the outer swivel bracket assembly opposite and outer roller and outer capture roller.

28. The device of claim 25, wherein the plurality of outer swivel roller assemblies are individually rotatable about an axis that is substantially orthogonal to the rotational axes of the outer roller and the capture roller.

29. The device of claim 25, wherein the plurality of outer swivel roller assemblies are rotatable about an axis that is substantially tangential to the edge of the outer roller nearest the inner swivel roller assemblies.

30. The device of claim 25, wherein the plurality of inner swivel roller assemblies each comprise:
   (a) an inner swivel bracket assembly; and
   (b) an inner roller mounted on the inner swivel bracket assembly.

31. The device of claim 30, wherein the each inner swivel roller assembly further comprises a counterbalance member mounted on the inner swivel bracket assembly.

32. The device of claim 31, wherein the counterbalance member is mounted on the inner swivel bracket assembly opposite and inner roller.

33. The device of claim 30, wherein the plurality of inner swivel roller assemblies are each rotatable about an axis that is substantially orthogonal to the rotational axis of the inner roller.

34. The device of claim 30, wherein the plurality of inner swivel roller assemblies are each rotatable about an axis that is substantially tangential to the edge of the inner roller nearest the outer swivel roller assemblies.

35. The device of claim 30, wherein the inner and outer swivel bracket assemblies are mounted for free, unpowered rotation so that the inner and outer swivel bracket assemblies can rotate freely in response to urging from the material tows.

36. The device of claim 25, wherein the plurality of inner and outer swivel roller assemblies are individually adjustably counter-balanced by counterbalance members that are capable of being tuned to the final roller assembly mass and center of gravity, thereby minimizing tow friction caused by changes in the fiber path.

37. A fiber placement assembly that guides composite material tows along a fiber path from a material supply creel to a fiber placement head during a composite material forming process, the assembly comprising:
   a material supply creel;
   an actuating assembly configured to produce three axes translational movement;
   a three axes wrist configured to produce three axes rotational movement, wherein the three axes wrist is operatively associated with the actuating assembly;
   a fiber placement head configured to consolidate and compact the composite material tows, wherein the fiber placement head is operatively associated with the three axes wrist; and
   a redirect device further comprising:
      a plurality of outer roller assemblies configured to direct and contain fiber tows received from the creel, and minimize tow friction caused by changes in the fiber path, each of the outer roller assemblies including:
         (a) an outer swivel bracket assembly;
         (b) an outer roller mounted on the outer swivel bracket assembly; and
         (c) a capture roller mounted on the outer swivel bracket assembly adjacent to the outer roller that is arranged and configured so that a tow can be captured between the outer roller and the capture roller;
      a plurality of inner roller assemblies configured to direct fiber tows received from the outer roller assemblies, and minimize tow friction caused by changes in the fiber path;
      a frame assembly configured to operatively connect the plurality of outer and inner roller assemblies; and
      wherein the outer roller assemblies and inner roller assemblies work in concert with one another to accommodate six axes of motion from the fiber placement assembly, and simultaneously allow the tows to move bi-directionally, both towards the material supply creel and towards the fiber placement head.

38. The device of claim 37, wherein the each outer swivel roller assembly further comprises a counterbalance member mounted on the outer swivel bracket assembly.

39. The device of claim 38, wherein the counterbalance member is mounted on the outer swivel bracket assembly opposite and outer roller and outer capture roller.

40. The device of claim 37, wherein the plurality of outer swivel roller assemblies are individually rotatable about an axis that is substantially orthogonal to the rotational axes of the outer roller and the capture roller.

41. The device of claim 37, wherein the plurality of outer swivel roller assemblies are each rotatable about an axis that is substantially tangential to the edge of the outer roller nearest the inner swivel roller assemblies.

42. The device of claim 37, wherein the plurality of inner swivel roller assemblies each comprise:
   (a) an inner swivel bracket assembly; and
   (b) an inner roller mounted on the inner swivel bracket assembly.

43. The device of claim 42, wherein the each inner swivel roller assembly further comprises a counterbalance member mounted on the inner swivel bracket assembly.

44. The device of claim 43, wherein the counterbalance member is mounted on the inner swivel bracket assembly opposite and inner roller.

45. The device of claim 42, wherein the plurality of inner swivel roller assemblies are individually rotatable about an axis that is substantially orthogonal to the rotational axis of the inner roller.

46. The device of claim 42, wherein the plurality of inner swivel roller assemblies are each rotatable about an axis that is substantially tangential to the edge of the inner roller nearest the outer swivel roller assemblies.

47. The device of claim 42, wherein the inner and outer swivel bracket assemblies are mounted for free, unpowered rotation so that the inner and outer swivel bracket assemblies can rotate freely in response to urging from the material tows.

48. The device of claim 37, wherein the plurality of inner and outer roller assemblies are individually adjustably counter-balanced by counterbalance members that are capable of being tuned to the final roller assembly mass and center of gravity, thereby minimizing tow friction caused by changes in the fiber path.

* * * * *

UNITED STATES PATENT AND TRADEMARK OFFICE
CERTIFICATE OF CORRECTION

PATENT NO. : 6,112,792
DATED : September 5, 2000
INVENTOR(S) : R.L. Barr et al.

It is certified that error appears in the above-identified patent and that said Letters Patent is hereby corrected as shown below:

Column 10,
Line 61, after "configured to" insert -- direct and contain fiber tows, and --
Line 62, after "fiber path" insert -- ; and --
Line 63, delete "each of the inner swivel roller assemblies including:" and insert therefor the following subindented clause -- (c) a plurality of inner swivel roller assemblies operatively connected to the frame assembly, wherein the inner swivel roller assemblies are configured to minimize tow friction caused by changes in the fiber path each of the inner swivel roller assemblies including: --

Column 12,
Line 11, "creel engaging an outer swivel roller assembly engag-" should read -- creel, engaging an outer swivel roller assembly, engag- --
Line 12, "roller assembly and" should read -- roller assembly, and --

Signed and Sealed this

Second Day of April, 2002

JAMES E. ROGAN
*Director of the United States Patent and Trademark Office*

*Attest:*

*Attesting Officer*